United States Patent [19]

Hanisch et al.

[11] 4,137,091
[45] Jan. 30, 1979

[54] IMPREGNATING AGENT FOR CAMOUFLAGE

[75] Inventors: Horst Hanisch, Niederkassel-Rheidt; Karl-Martin Rödder; Hansjürgen Hass, both of Troisdorf-Spich, all of Germany

[73] Assignee: Dynamit Nobel Aktiengesellschaft, Troisdorf, Bezirk Cologne, Germany

[21] Appl. No.: 772,057

[22] Filed: Feb. 25, 1977

[30] Foreign Application Priority Data

Mar. 3, 1976 [DE] Fed. Rep. of Germany ....... 2608668

[51] Int. Cl.$^2$ .......................... C09K 3/00; C09K 3/18
[52] U.S. Cl. ................................. 106/287.16; 106/2
[58] Field of Search .................... 106/287 SE, 287.16; 260/29.2 M, 37 SB; 428/447

[56] References Cited

U.S. PATENT DOCUMENTS

| 2,562,488 | 7/1951 | Fuchs | 260/430 |
| 2,593,817 | 4/1952 | Waggoner | 428/447 |
| 3,879,206 | 4/1975 | Nestler et al. | 109/12 |
| 3,976,497 | 8/1976 | Clark | 106/287 SE |

*Primary Examiner*—Theodore Morris
*Attorney, Agent, or Firm*—Sprung, Felfe, Horn, Lynch & Kramer

[57] ABSTRACT

A camouflage impregnating agent comprising a silver salt dissolved in an alcoholic solution of an alkyl trialkoxysilane; a process for camouflaging an oxidic surface by applying thereto a camouflage impregnating agent comprising a silver salt dissolved in an alcoholic solution of an alkyl trialkoxysilane.

4 Claims, No Drawings

IMPREGNATING AGENT FOR CAMOUFLAGE

BACKGROUND OF THE INVENTION

1. Field of the Invention

This invention relates to camouflage impregnating agent which provides an impregnating action in addition to a camouflage. More especially this invention relates to camouflage impregnation comprising a silver salt dissolved in an alcoholic solution of an alkyl trialkoxysilane. This invention relates to a camouflage impregnating agent which can be applied at subfreezing temperatures and which is not adversely affected thereby.

2. Discussion of the Prior Art

Through German "Offenlegungsschrift" No. 24 15 741, it is known to use solutions of silver salts for the preparation of camouflage paints. According to the information given in this specification, a camouflage paint of this kind avoids the disadvantages which result when colored coatings of organic polymers or of alkyl polysilicates are applied as camouflage paints. The aqueous solutions of silver salts which are proposed in this specification, however, involve a number of disadvantages: they do not penetrate deeply enough into the medium being camouflaged and accordingly they are easily washed away by heavy rainfall. This washing out is promoted by the fact that the paints made with these substances have no impregnating action, because according to the information contained in the specification, impregnating has an undesirable effect on the skid-resisting quality of concrete. Accordingly, the silver coating is only on the surface of the concrete; it is thus umprotected and can easily be worn off or washed off.

If wetting agents are added to the silver salt solutions to enable them to penetrate deeper into the pores, the danger exists that the water which seeps into the pores that are deeper under the surface will remain too long and will cause frost damage if freezing occurs. Furthermore, the application of such solutions is not possible at temperatures below freezing.

It is an object of this invention therefore, to provide a camouflage impregnating agent which cannot be washed out by precipitation and which is insensitive to frost. Moreover, it is an object of this invention to provide a camouflage impregnating agent for an oxidic surface which has no adverse effect upon the skid resistant qualities of the material being camouflaged. It is a further object of this invention to provide a camouflage impregnation in which advantage of the use of silver salts can be realized.

SUMMARY OF THE INVENTION

Broadly this invention contemplates a camouflage for an oxidic surface comprising a silver salt dissolved in an alcoholic solution of an alkyl trialkoxysilane. Thus in accordance with the present invention the problems attendant the use of prior art camouflage paints are solved by employing the silver salts in the form of an alcoholic solution of alkyl trialkoxysilane. The amount of silver salt dissolved in the alcoholic solution can vary widely depending upon the silane content of the solution. To obtain coloration of the substrate for adequate camouflaging effect the silver content of the solution need only be between 0.5 and 3.0% by weight, based upon the entire weight of the solution. However, larger quantities of silver can be included in the alcoholic solution. Such larger quantities do not provide significantly greater camouflaging effect. The large silver quantities have been observed to provide virtually no increase in camouflaging effect or only a slight increase thereof.

Silver nitrate is the preferred silver salt for use in the camouflaging of paint. However, other alcohol-soluble silver compounds are suitable such as silver oxalate or silver acetate.

Preferred alcohols are those having 1 to 3 carbon atoms. The alkyl trialkoxysilanes dissolved in the alcohols are those of the general formula $R—Si(OR')_3$, in which R represents an alkyl moiety of 1 to 8 carbon atoms, preferably of 3 to 5 carbon atoms, and R' is an alkyl moiety of 1 to 4 carbons, which if desired can be interrupted by an oxygen atom.

The concentration of the alkyl trialkoxysilanes in the alcohols can vary within wide limits. In general, concentrations between 5 and 60 wt.-% are used; however, solutions containing up to 85% of the alkyl trialkoxysilanes in alcohol can also be used.

When the camouflage impregnating agent of the invention is used, the above-described disadvantages of the formerly known camouflage paints are not encountered. In the event of a frost, no damage is done to the structure to be protected. The agent can also be applied even at temperatures as low as $-20°$ C. Furthermore, the hydrophobizing of the substrate which is simultaneously accomplished prevents the washing out of the camouflage paint, so that the permanence of the coloring is considerably improved.

No change has as yet been found in the skid factors after the application of the camouflage impregnating agent of the invention.

The objects to be colored include structures having inorganic-oxidic surfaces. Examples of materials having such surfaces are lime sandstone, cement mortar, concrete or plaster.

The coloring of the material takes place about 24 hours after the application of the solutions. The amount of the solution to be applied can vary between 25 g/cm$^2$ and 1000 g/cm$^2$. The intensity of the colors obtained depends on the amount of solution applied and its concentration. One can treat the surfaces two or more times with the solutions in order to intensify the color.

The application of the solutions to the surfaces is performed by known methods, such as wiping, spraying, atomizing or brushing. When solutions of equal concentrations are applied, stronger dark tones are obtained on concrete surfaces than on lime sandstone.

In order to more fully illustrate the nature of the invention and the manner of practicing the same the following example is presented.

EXAMPLE

A concrete block (14.5 × 7.5 × 4.7 cm) was immersed twice for 60 seconds in a solution of 59 weight-parts of anhydrous ethanol, 40 weight-parts of isobutyl trimethoxysilane and 1 weight-part of silver nitrate. The plate absorbed about 100 g/m$^2$ of the solution. The specimen was let stand for 7 days exposed to daylight. The initially light gray surface assumes a brownish coloration in the course of a day, which in the course of 6 days deepened to a dark brown color. At the end of 7 days, the water absorption of the test specimen was determined by soaking it in water (under a 10 cm water column, corresponding to a driving rain at a wind velocity of about 130 km/h) and then weighing. The determined values are listed in Table 1 in comparison with a concrete not treated in accordance with the invention. At the end of the water soaking, the concrete block had the same color as at the beginning of the water treatment.

Table 1:

| Moisture absorption of concrete blocks in % of dry weight | | | |
|---|---|---|---|
| Hours of immersion | 9 | 72 | 240 |
| Not impregnated in accordance with the invention | 3.16 | 3.27 | 3.52 |
| Impregnated in accordance with the invention | 0.34 | 0.47 | 0.70 |

What is claimed is:

1. A camouflage impregnating agent for an oxidic surface comprising a silver salt dissolved in an alcoholic solution of a $C_{1-8}$ alkyl trialkoxysilane.
2. A camouflage impregnating agent according to claim 1 wherein the alcoholic solution of alkyl trialkoxysilane is a 5 to 60% solution of a $C_{1-8}$ alkyl trialkoxysilane in ethanol.
3. A camouflage impregnating agent according to claim 1 wherein the silver salt is silver nitrate and the silver nitrate is present in the solution in an amount between 0.5 and 3.0 weight percent, based upon the weight of the entire solution.
4. A camouflage impregnating agent according to claim 2 wherein the silver salt is silver nitrate and the silver nitrate is present in an amount between 0.5 and 3.0 weight percent based upon the weight of the entire solution.

* * * * *